(12) United States Patent
Soerensen et al.

(10) Patent No.: US 7,957,758 B2
(45) Date of Patent: Jun. 7, 2011

(54) METHOD OF AND APPARATUS FOR REDUCING POWER CONSUMPTION IN A MOBILE TELEPHONY SYSTEM

(75) Inventors: Joern Soerensen, Aars (DK); Carsten Griem, Gistrup (DK); Carsten Pedersen, Belmont, MA (US)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 627 days.

(21) Appl. No.: 11/818,226

(22) Filed: Jun. 13, 2007

(65) Prior Publication Data

US 2008/0311947 A1 Dec. 18, 2008

(51) Int. Cl.
*H04B 7/00* (2006.01)
(52) U.S. Cl. ............... 455/522; 455/574; 455/343.2; 370/311
(58) Field of Classification Search ............ 455/226, 455/343.1–6, 522, 515, 514, 574; 370/311, 370/337
See application file for complete search history.

(56) References Cited

U.S. PATENT DOCUMENTS

| 5,570,369 A * | 10/1996 | Jokinen ............... 370/311 |
| 2001/0023184 A1 | 9/2001 | Kalveram et al. |
| 2005/0030914 A1 * | 2/2005 | Binzel et al. ............ 370/312 |
| 2007/0184866 A1 * | 8/2007 | Kim et al. ............... 455/515 |
| 2008/0311947 A1 * | 12/2008 | Soerensen et al. ........ 455/522 |

FOREIGN PATENT DOCUMENTS

| DE | 19813507 A1 | 9/1999 |
| EP | 1111943 A | 6/2001 |
| WO | WO 97/20446 A | 6/1997 |
| WO | WO 98/48521 A | 10/1998 |

* cited by examiner

*Primary Examiner* — Edward Urban
*Assistant Examiner* — Golam Sorowar
(74) *Attorney, Agent, or Firm* — Winston Hsu; Scott Margo

(57) ABSTRACT

A method of decoding data comprising a plurality of data-bursts, comprising the steps of:
i) receiving a first one of the data-bursts,
ii) associating hypothesis data with the or each received data-bursts;
iii) attempting to decode the data; and
iv) if the decode is successful to power down the receiver, and if the decode is unsuccessful receiving a further one of the data-bursts and repeating steps ii) to iv), until all of the data has been received.

14 Claims, 5 Drawing Sheets

| DETECTION ERROR RATE - CCCH FER (PDTCH/CS1 BLER) | | | | |
|---|---|---|---|---|
| | Number of bursts received | | | |
| Eb/No | 1 | 2 | 3 | 4 |
| 0 | 100% | 100.0% | 95.3% | 41.4% |
| 2 | 100% | 100.0% | 20.6% | 0.5% |
| 4 | 100% | 97.8% | 0.1% | 0.0% |
| 6 | 100% | 61.3% | 0.0% | 0.0% |
| 8 | 100% | 9.6% | 0.0% | 0.0% |
| 10 | 100% | 0.3% | 0.0% | 0.0% |

1,000 frames

Fig. 5a

| DETECTION ERROR RATE - CCCH FER (PDTCH/CS1 BLER) | | | | |
|---|---|---|---|---|
| | Number of bursts received | | | |
| Eb/No | 1 | 2 | 3 | 4 |
| 0 | 100% | 99.8% | 72.2% | - |
| 2 | 99.3% | 94.6% | 5.5% | - |
| 4 | 89.3% | 64.0% | 0.0% | - |
| 6 | 44.3% | 15.5% | 0.0% | - |
| 8 | 9.6% | 1.5% | 0.0% | - |
| 10 | 0.8% | 0.0% | 0.0% | - |

1,000 frames

Fig. 5b

METHOD OF AND APPARATUS FOR REDUCING POWER CONSUMPTION IN A MOBILE TELEPHONY SYSTEM

FIELD OF THE INVENTION

The present invention relates to a method of and apparatus for reducing power consumption within a mobile telephony system when, for example, seeking to monitor a signal which is periodically transmitted from a base station to modify the operation of mobile units responsive to that base station.

BACKGROUND OF THE INVENTION

Users of mobile telephony devices, such as mobile phones, expect the mobile telephone to be able to stay in "standby" mode for several days between recharges. However when a mobile telephone is in standby mode, it must still negotiate with the telecommunications infrastructure with which it is co-operating, and it must still be responsive to receiving a call. Therefore, it is not possible to de-power the telephone's receiver circuitry all of the time.

Within the GSM telecommunications system, the base station transmits a paging messages on a paging channel which mobile devices need to examine in order to determine if a call is being routed to them. The repetition rate of the paging message is determined by the base station operator, although it is constrained by the GSM standard. The mobile device can conserve battery power by shutting off its radio frequency receiver and much of its data processing architecture during the time period between transmissions of the paging message. However the receiver and the data processor within the mobile device needs to be operative for each reception of the paging message in order to determine whether the mobile device is being called: The paging message within the GSM standard is transmitted as four data-bursts within a single paging block. The inter-burst interval within a paging block is 4.615 ms. This makes it possible to de-power the radio receiver for some of the time between adjacent paging messages so as to reduce the current drawn from the battery of the mobile device, and thereby increase its standby time.

It is known that further advances in power reduction could be obtained if it was not necessary to receive every one of the data-bursts within the paging block all of the time.

U.S. Pat. No. 5,570,369 discloses a GSM receiver in which an attempt to decode paging data is made once two out of the four paging data bursts have been received. If the decode process fails, then the third paging data burst is received and the decode process is repeated. If it fails then the fourth paging data burst is received. It should be noted that in this arrangement two out of four data bursts of the paging block represents the absolute minimum amount of data that is required for the Viterbi decoder to function correctly.

EP 1389883 discloses an arrangement in which the message received during a first paging burst is compared with a known message. This can be achieved by computing the differences between the corresponding data bits of the incoming data and known data after equalisation. If the incoming data burst matches that expected of the known message, then known data from a known message is retrieved from memory, used to fill in the data that has yet to be received, and then decoded. A problem with this approach is that adding in three bursts of known data prior to decoding is almost certainly going to force the decoder to return data corresponding to the pre-known message. Thus the decoding process is over-constrained. If the first burst does not correspond to a pre-known message, then a second burst is received, and data from the first bursts are presented for decoding, with data for the as yet unreceived third and fourth burst being marked as unreliable, much as U.S. Pat. No. 5,570,369 operates.

SUMMARY OF THE INVENTION

According to a first aspect of the present invention there is provided a method of decoding data comprising a plurality of data-bursts, the method comprising the steps of:
i) receiving a first one of the data-bursts;
ii) associating hypothesis data with the or each received data-burst;
iii) attempting to decode the data; and
iv) if the decode is unsuccessful receiving a further one of the data-burst and repeating steps ii) to iv) until all of the data-bursts have been received.

Preferably the data is convolutionally encoded. It is known that the convolutional encoding functions as a state machine such that only a limited number of transitions can be made from one symbol to the next. This is exploited by the convolutional decoder, such as a Viterbi decoder, in order to allow the data sequence to be recovered, even in the presence of errors, by looking for the least cost path through the recovered data. The inventors noted that the convolutional decoder is especially good at dealing with incomplete data sets when the incomplete or unknown data is regularly spaced within the received stream of data. This is the case in the GSM telecommunications system where the paging data is interleaved so as to give enhanced resistance to error bursts occurring in the received data. This means that it would be possible to recover data from the transmitted data even if one or more of the data-bursts were not recovered. The inventors also realised, crucially, that it would be possible under certain circumstances to successfully recover a subset of messages from only one of the data-bursts provided that additional data, representing a hypothesis as to what message was being transmitted was also added to the single received data-burst. However, the hypothesis should be handled carefully so as not to over constrain the decode process, or force it to follow the hypothesis data in preference to the actual received data.

To put this in context, within a GSM mobile telephone system the base station periodically transmits a paging block. The paging block contains data identifying the mobile devices within that cell which are being called. The paging blocks are retransmitted regularly and there is a reasonable statistical expectation that the data in a paging block may not vary from the data transmitted in a preceding paging block. Under those circumstances data which had been successfully recovered from a preceding data block may be re-encoded using a process mirroring that used by the base station in order to create hypothesis data which can be used in the decode process in place of data-bursts which have not yet been transmitted by the base station (and not yet received) as part of the paging block. If the hypothesis as to the content of the paging block is correct, then the convolutional decoder and an associated cyclic redundancy check mechanism will indicate a successful decode and a mobile device need not then expend energy on receiving the later data-bursts from the paging block because it has already successfully decoded the message. Therefore the receiver section can be shut down.

The inventors have realised that the power of the convolutional encoding and the cyclic redundancy checks used within the GSM system means that the likelihood of the receiver falsely indicating that it has correctly decoded a paging block is very very low (of the order of 1 in 500,000). Furthermore, the performance of GSM mobile phones, and in particular the noise performance of receivers therein, when coupled with an increased density of cells means that often the convolutional decoder would be successful in decoding the paging block after receiving only two or three of the data-bursts. However, where the content of a data-burst has been predicted then studies by the inventors show that it is often possible to recover the data from the paging block after receiving only one of the data-bursts. This can give rise to significant reductions in average power consumption by the receiver circuitry.

Advantageously the convolutional decoder is also responsive to metadata which is used to indicate a degree of confidence in the data provided to the convolutional decoder. In the context of a mobile telecommunications device the metadata is a confidence value which is derived from an average of the signal to noise ratio for the entire burst and an estimate of the "quality" of the individual received symbols. Channel conditions may mean that even under high signal to noise ratio conditions the decoding quality of the symbols may be poor. Therefore, if the signal is much stronger than the noise and the "quality" is good then the confidence in the received data being correct is high, whereas if the signal to noise ratio is much lower then the likelihood of bits within the data being incorrectly decoded is much higher, and the confidence data is adjusted to reflect this. The hypothesis data provided to the decoder helps to guide the decoder through the decoding process by substituting the hypothesis data in the place of real data which has not yet been received. However it is important that the hypothesis data does not guide the decoder too strongly otherwise the hypothesis data would dominate the decoding process and result in the hypothesis data being decoded by the convolutional decoder. Therefore the metadata or confidence information associated with the hypothesis data is set to a low confidence value such that it does not overrule the received data.

The hypothesis data could be calculated a priori based on expectations of the network operator's performance. However within a typical paging block there are some "filler bits" and the GSM standard does not specify what these bits must be set to. However, if network operators pre-declare what they will do in practise then calculation of the paging block is possible. However, in a preferred embodiment the hypothesis data (also referred to as a "hypothesis vector") is generated on the basis of a received message which has already been decoded by the mobile device.

The hypothesis vector may relate to an empty paging block, but expectations about network performance may cause this to be modified. However, the invention is not limited to use with the paging channel and my also be used, for example, with the common control channel (CCCH) where system related messages are transmitted.

According to second aspect of the invention there is provided a telecommunications receiver adapted to decode data transmitted as a plurality of data-bursts, said telecommunications receiver arranged to:
i) receive a first one of the data-bursts
ii) associate hypothesis data with the or each received data-burst;
iii) attempt to decode the data, and
iv) if the decode is successful to power down the receiver, whereas if the decode is unsuccessful the receiver is arranged to receive a further data-burst and repeat steps ii) to iv) until all of the data-burst have been received.

BRIEF DESCRIPTION OF THE DRAWINGS

The present invention will further be described, by way of example only, with reference to the accompanying drawings, in which:

FIGS. 5a and 5b compare detection error rates of the prior art and the present invention, respectively.

DESCRIPTION OF PREFERRED EMBODIMENTS OF THE INVENTION

Figure 1:
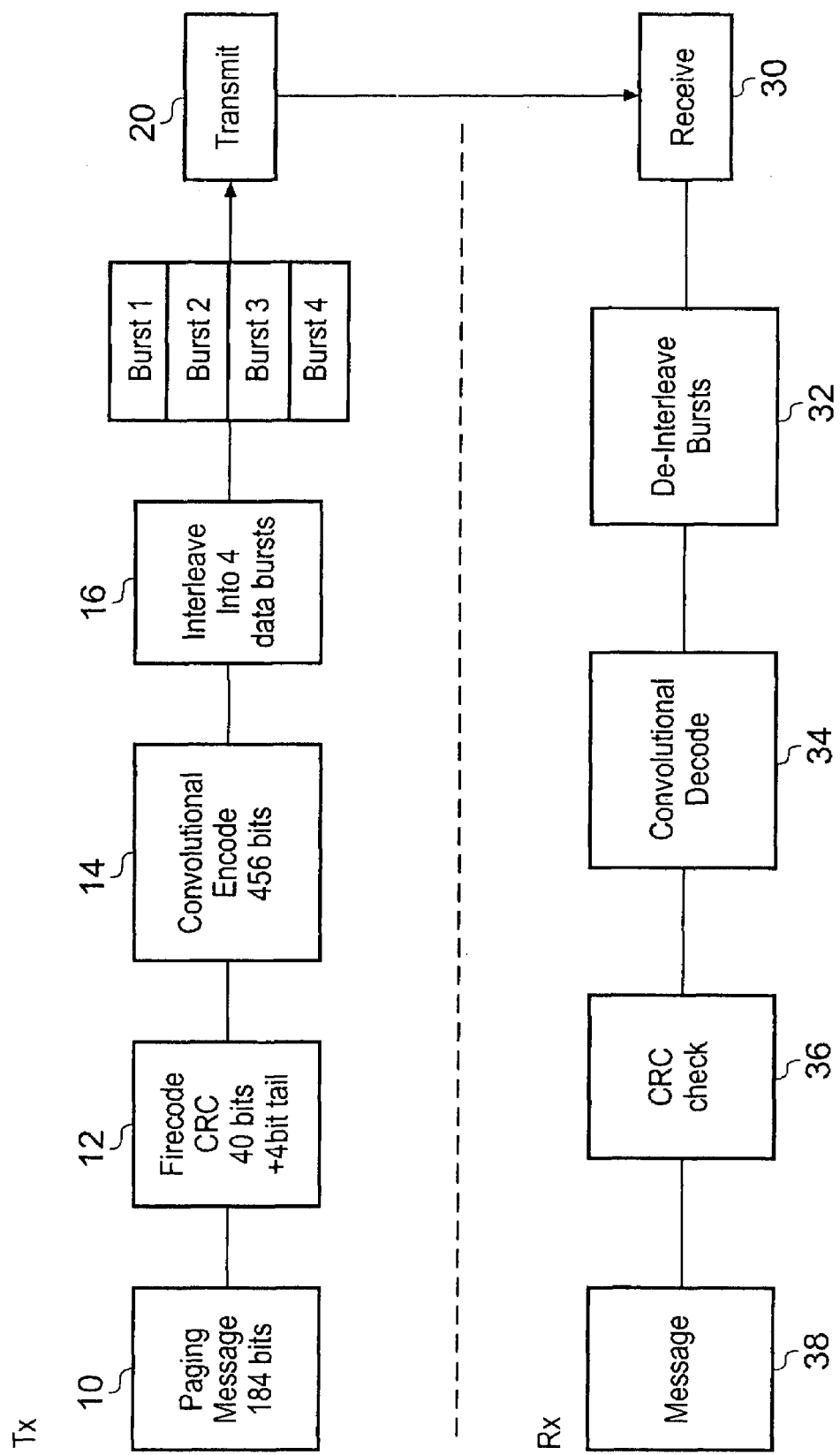
FIG. 1 schematically illustrates the encoding and decoding processes used to encode and subsequently decode a paging block within a GSM telephone system.

Before considering the present invention in detail, it is briefly worthwhile placing it in context by describing the way in which a paging signal is formed. FIG. 1 schematically illustrates the processes used to transmit a paging message by the base station, together with the steps taken by prior art mobile devices.

For simplicity, we shall assume that the base station has already prepared a paging message, which identifies International mobile subscriber identity (IMSI) or temporary mobile subscriber identity (TMSI) numbers for mobile devices which are being called. The paging message, designated by block 10, comprises 184 bits. The paging message is then encoded using the GSM channel codec by appending a 40 bit cyclic redundancy code check (known as a firecode) at step 12. A further four tail bits are appended such that, at this stage, the message comprises 228 bits. The cyclic redundancy check provides a strong error checking mechanism and is expected to only falsely pass 1 in 500,000 messages as being correctly decoded. The data is then transferred to a convolutional encoder which is well known to the person skilled in the art and does not need to be described here, which outputs two bits for each incoming bit, such that the data now comprises 456 bits. From the convolutional encoder 14, the data is provided to an interleaver 16 which slices the data into four data-bursts. If we label the bits 1 to 456, then data-burst one comprises bits 1, 5, 9 and so on. Data-burst 2 comprises bits 2, 6, 10 and so on. Data-burst 3 comprises bits 3, 7, 11 and so on, and finally data-burst 4 comprises bits 4, 8, 12, 16 and so on. The interleaving may also include intra-burst interleaving such that the bits are moved around within the data-burst. The data-bursts are then encoded and transmitted in accordance with the GSM standard, and these processes do not need to be described here. At the receiver, the process is reversed such that the transmitted data-bursts are received by an RF front end, down-converted and demodulated within the RF architecture, generally designated 30, of the mobile device. The demodulated bit stream is then provided to a de-interleaver 32 which receives each data-burst and places the bits transmitted therein into the correct positions for them within the block of data which is to be decoded. This block of data is held in memory such that the bit positions can be filled in by the interleaver as and when a data-burst containing information relevant to the bit positions as received. Thus, after reception of the first data-burst only bit positions 1, 5, 9 and so on can be correctly filled in. No data has yet been received about the bit positions 2, 3, 4, 6, 7, 8, 10, 11, 12, 14 and so on. The de-interleaved data in the memory, which may be incomplete, is then provided to a convolutional decoder 34 which attempts to decode the data which has been received. As noted before, decode attempts can be made before the final data-burst has been received as the convolutional decoder has the ability to retrieve the data from the message before all the data-bursts have been received provided that the signal to noise ratio of the received signal is sufficiently good. The decoded data is then passed through a cyclic redundancy checker 36 which checks to see whether the decoded message is valid. If yes, then the decoded message, designated 38, can then be passed up the protocol stack within the mobile device. However, if the cyclic redundancy checker 36 indicates that the message has not been validly decoded, then it flags a decode error.

Figure 2:
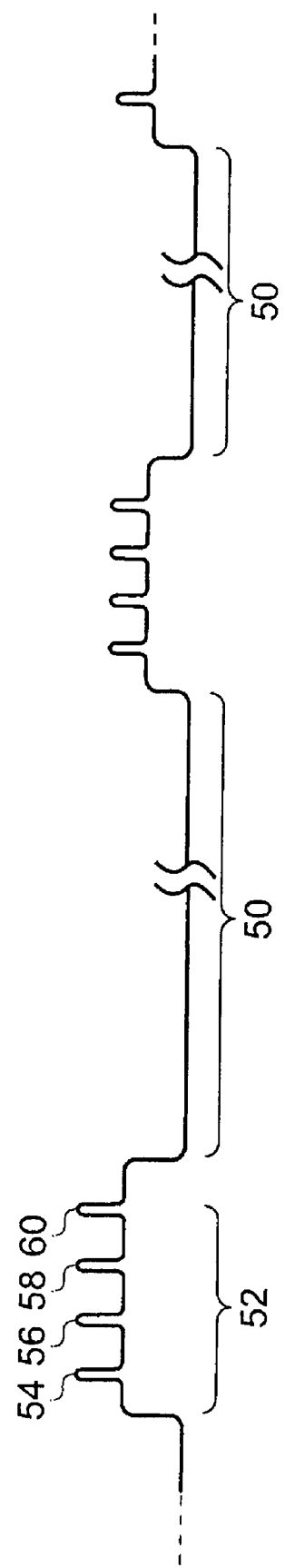
FIG. 2 schematically illustrates current consumption as a function of time within a mobile telephone constituting an embodiment of the present invention.

FIG. 2 schematically illustrates the power consumption of the receiver when seeking to recover the paging information. The paging blocks occur at intervals of anything between 470 ms and 2118 ms in 235.4 milliseconds increments. This timing arrangement is dictated by the GSM standard. The time taken to transmit the paging block is much less than this, and the whole process is over in less than 18.5 ms. It can therefore be seen that, for the majority of the time designated 50 between the paging blocks the receiver of the mobile device can be powered down, thereby reducing the draw of current from the battery. During this time, the system clock of the mobile phone is also de-powered, thereby shutting down the digital circuitry and timing is maintained by a low power, and relatively low accuracy, oscillator. Once an appropriate inter-paging block time interval has timed out, functionality is restored by powering up the digital processors of the mobile phone, and powering up the radio receiver 30 such that it can recover the first paging block 52 of the paging message. The set up time for the receiver in a phone may be sufficiently short that the receiver can be partially or fully de-powered for some of the time between the data-bursts within the paging block. Following reception of the first data-burst 54 it is decoded, de-interleaved, and the results are held in memory. Even under good reception conditions, for example where the signal to noise ratio is sufficiently good such that there are no errors that the output of the receiver, the convolution decoder within prior art systems does not have sufficient information to estimate the received message until at least two of the data-bursts have been received. As noted before, prior art systems take a brute force approach such that after each data-burst has been received and de-interleaved, the partial message held in the memory between the de-interleaver and the convolutional decoder, such as the Viterbi decoder, is processed by the decoder in an attempt to recover the message. This process is repeated as each succeeding data-burst 56, 58 and finally 60 is recovered until such time as a successful decode is achieved, or until all the data-bursts have been received and the decode is either successful or unsuccessful.

Figure 3:
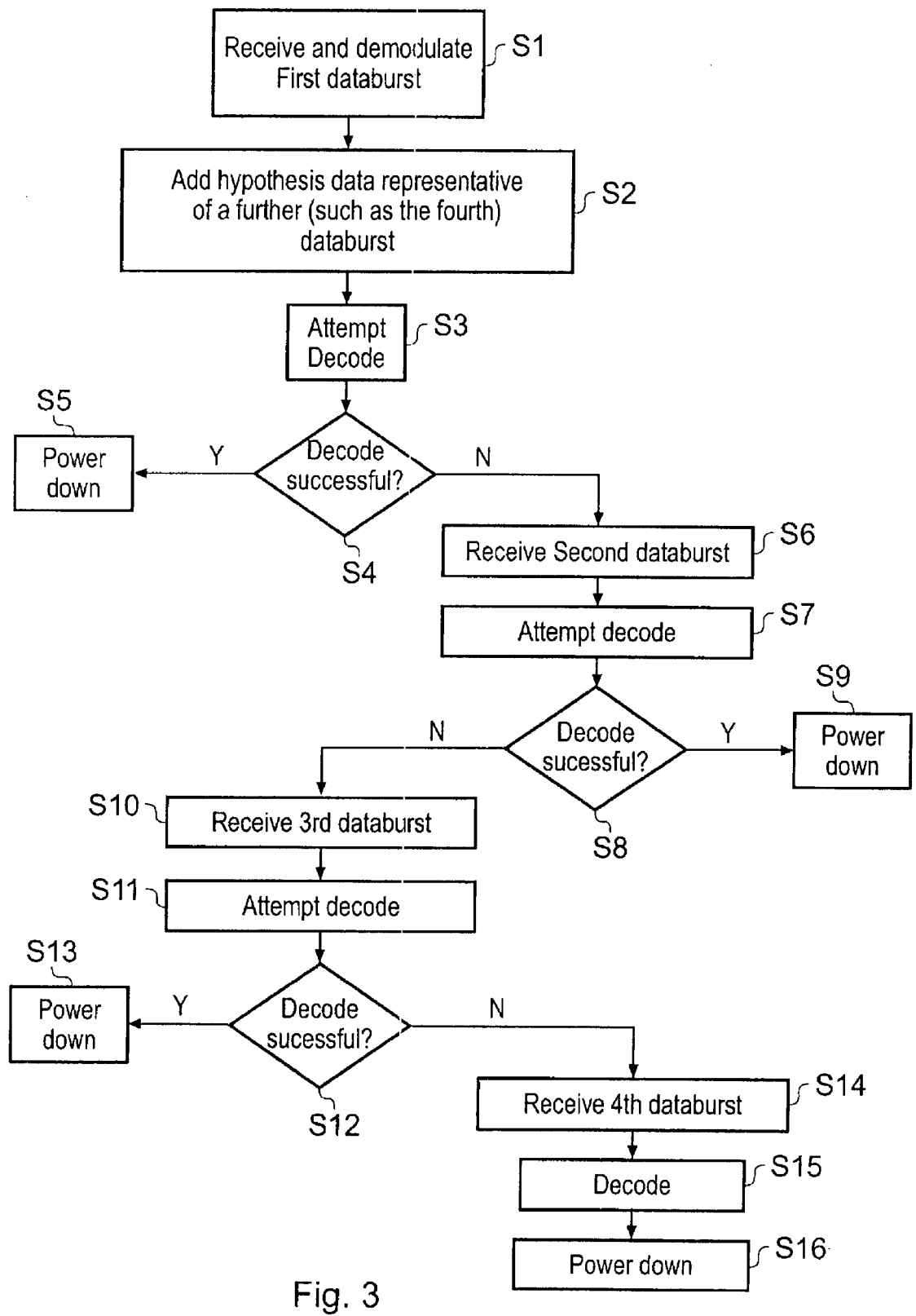
FIG. 3 schematically illustrates a paging block decode process formed within a mobile device operating in accordance with the present invention.
Figure 4:
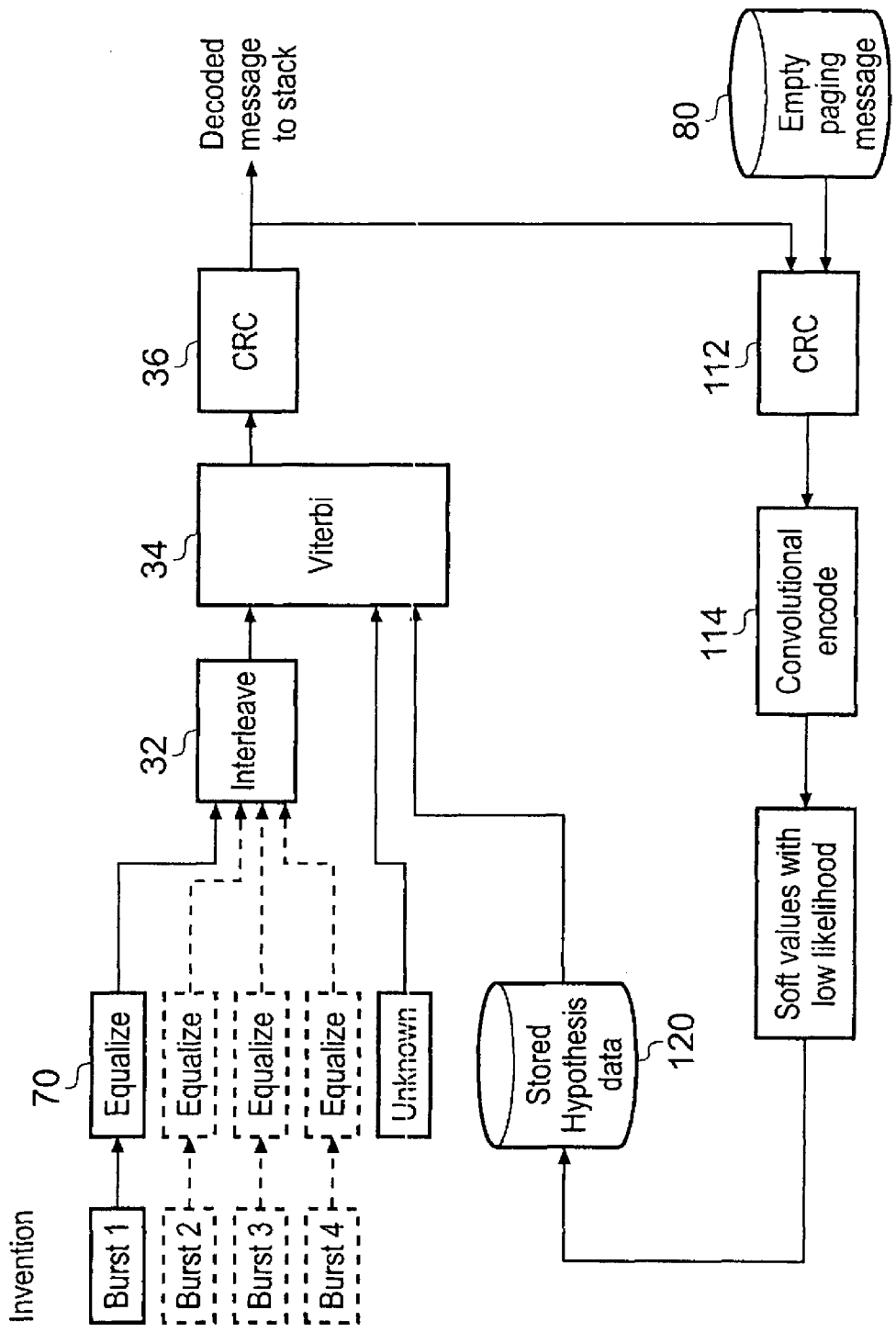
FIG. 4 schematically shows an apparatus for performing the process of FIG. 3.

FIG. 3 schematically illustrates a decoding process in accordance with the present invention, and FIG. 4 shows an apparatus for performing the decoding process.

As before, the data-bursts are received in succession. Once the data-burst has been received it may optionally be equalised by an equaliser 70 (FIG. 4) before being provided to the de-interleaver 32 which places the bits from each received data-burst into their correct position within a data set prior to providing that data set to the Viterbi or other convolutional decoder 34 which makes an estimate of the received message based on a least cost decoding, and then provides that estimate to the cyclic redundancy checker 36. As noted before, the performance of the Viterbi or other convolutional decoder is such that it cannot decode the received message with only one quarter of the bits having been received, but if the signal to noise ratio of the received signal is high enough, then it can decode the message if it is provided with data equivalent to two bursts worth. The present invention, unlike the prior art, provides an estimate of what data might be contained in more of the as yet unreceived data-bursts. This estimate of the data which is yet to be received is "hypothesis data" and, because the convolutional encoding and interleaving mixes the transmitted data up, and if the hypothesis data matches the data that is going to be transmitted, then the Viterbi decoder has the capability of decoding the transmitted data after receiving only one data-burst. However, if the hypothesis data does not match the transmitted data the convolutional decoder will produce a random data vector which will not pass the CRC check. In a first preferred embodiment of the invention the stored hypothesis data is stored in a memory, and is representative of the data which would be transmitted in the fourth burst 60 of the paging signal. Burst positions corresponding to the second and third data bursts are filled with "unknown" data—which is known in the art. This has the advantage that, if the decode is unsuccessful after having received the first burst, then the second burst can be received and the first and second bursts of real data, together with the hypothesis data corresponding to the fourth burst 60 can then be presented to the decoder for decoding without the necessity of having to rewrite the hypothesis data to the data memory accessed by the Viterbi decoder because the hypothesis data does not get overwritten by the data from the second burst 56. Similarly, if decoding failed at this point, then the third burst 58 could also be received without having to move the hypothesis data because once again it would not be overwritten by the data from the third data-burst. Finally, if the decode did not succeed after having received the first, second and third data-bursts, then the fourth burst 60 would be received and then at this point the hypothesis data is overwritten with the real data.

This successive receive and test process is schematically illustrated in FIG. 3 where the first data-burst is received and decoded at step S1. The hypothesis data representing the data for the fourth data-burst is then added to the received data at step S2 and a decode attempt is made at step S3. Where, for example, the hypothesis data represents a empty paging data-burst and the received data also represents an empty paging data-burst, then the decode is likely to be successful. The decode success is checked by the cyclic redundancy checker at step S4 and if the decode is successful then control is passed to step S5 where the receiver is powered down as there is no need to receive the remaining data-bursts. However if the decode is not successful then control is passed to step S6 where the second data-burst is received. From then a further decode attempt is made at step S7 and the success of the decode attempt is checked at step S8. If the decode is successful then control is passed to step S9 where the receiver is powered down. If the decode is unsuccessful then control is passed to step S10 where the third data-burst is received and a further decode attempt is made at step S11. The success of the decode is tested at step S12 and if it is successful control is passed to step S13 where the receiver powers down. However if the decode is not successful then control is passed to step S14 where the fourth data-burst is received, thereby overwriting the hypothesis data. A decode attempt is then made at step S15 and because no further decode attempts can be made the receiver is then powered down at S16.

Typically the hypothesis data might correspond to that of an empty paging message. The data corresponding to an empty paging message could be stored in a memory 80, or alternatively the network operator's paging datagram could be used as the basis for creating the hypothesis data. Thus, the decoded message from the cyclic redundancy checker 36 might be used as the basis for forming the hypothesis data. Whether the source for the hypothesis data be pre-stored or is a previously successfully decoded message is a free choice of the system designer. However from here, it is advantageous that the hypothesis data be recreated by encoding the data in a process matching that used by the base station. This approach guarantees that there are no errors in the bit sequence, which could occur if the previously demodulated bits were merely stored for reuse. Therefore the hypothesis message is provided to a cyclic redundancy coder 112 which matches the cyclic redundancy coder 12 used in the base station. From here the data is convolutionally encoded by an encoder 114. The output of the convolutional encoder 114 is then associated with "soft values" which act as metadata representing the confidence in the output data from the convolutional encoder 114 being correct. The confidence value for the hypothesis data is set as low as possible as this is guidance information for which we have a low confidence in it being correct. If the hypothesis data turns out to be incorrect it is important that it does not over guide the Viterbi decoder to decode the hypothesis data instead of the received message. This forms the hypothesis data which is then stored in a memory 120 such that it can then be provided to the Viterbi decoder after reception of the first data-burst such that, the sum of the first data-burst and the stored hypothesis data represents at least two bursts worth of data and therefore, if the hypothesis data is correct then the Viterbi decoder has the capability of correctly decoding the existence of the empty paging message. If the first burst of received information corresponds to an empty paging message then the sum of the hypothesis data and the first burst data will correctly guide the Viterbi decoder to a valid paging message result. As noted before, the confidence associated with the hypothesis data is set to a low value such that, if the data from burst one does not correspond to an empty paging message then the Viterbi decoder will not be able to decode a message which passes a cyclic redundancy check and hence the decode failure will occur. Furthermore the existence of the hypothesis data will not under these conditions cause the system to think that it has received an empty paging message because the confidence weight associated with the stored hypothesis data is low. Thus once a second paging data-burst has been received there is a high probability that the paging message will be correctly decoded despite the presence of incorrect hypothesis data.

It will thus be noted that, if the data in burst one does correspond to an empty paging message then there is a high likelihood that only one burst will need to be received in order for a decoded message to be indicated at the output of the cyclic redundancy checker 36. Under these conditions it is not necessary to receive the second, third or fourth bursts 56, 58 and 60 and consequently the radio receiver and the data processors can shut down early, thereby reducing power consumption from the battery.

Because the hypothesis data is only lightly weighted within the decode process, it will not drag the decoder towards an incorrect result and therefore if the decoded message is not an empty paging message then the content of the paging message should be correctly decoded after two bursts despite the existence of the hypothesis data, provided that the confidence in the received data is sufficiently high. These confidence metrics are provided by the receiver in a known way, and therefore do not need to be described further here.

The hypothesis data can be modified based on network traffic. Thus, if a mobile device is in a cell where very few calls are occurring, then there is a high expectation that each succeeding paging signal will be an empty paging message. However, in such a cell where calls are relatively infrequent, then once a paging message is not empty, it could be assumed that the paging message will continue not to be empty for a while because the telephone may not be able to answer the call if it has been abruptly switched off or has moved into an area of poor reception. Therefore, once a non-empty paging message has been received this could alternatively be used as the hypothesis vector for the next paging message. This is, once again, a option which can be determined by the system designer.

As described thus far, hypothesis data has only been provided corresponding to one of the data-bursts, namely the fourth data-burst 60. It is possible to provide hypothesis data representing any one, or indeed more of the data-bursts. However, as more and more hypothesis data is added then there becomes an increasing risk that they hypothesis data will over-constrain the convolutional decoder and that, eventually, the convolutional decoder will be primarily guided by the hypothesis data and hence will decode the hypothesis result. Thus, providing excess hypothesis data would fall into the trap of EP 1389883 described hereinbefore which compares a data-burst with a previously received data-burst, and if the match is good enough then data for the remaining three data-bursts are populated with the previously received data-burst, and consequently the system is almost certainly bound to indicate that it has correctly decoded data which it has already correctly decoded, and consequently the value of the decoding process is suspect. In the present invention the hypothesis data is always provided irrespective of whether or not the first data set strongly matches any previously received data. Thus the comparison step of EP 1389883 is completely avoided.

FIGS. 5a and 5b compare the detection error rate of a prior art system with that of the present invention for differing values of Signal ($E_b$) to Noise ($N_o$) powers. It can be seen that the prior art has a 100% failure rate after only receiving one data burst—irrespective of the signal to noise ratio. By contrast, with a good signal to noise ratio the present invention can achieve an error rate of less than 1% after receiving only one data-burst.

It is thus possible to provide an improved method and improved receiver for decoding a message, such as a paging message (although the invention is not restricted to this) such that if the first data-burst is combined with hypothesis data, where the hypothesis data advantageously corresponds to less than the remaining as yet unreceived data, the convolutional decoder may correctly decode the message when the hypothesis data correctly identifies the content of the message that is being received.

The invention claimed is:

1. A method of decoding data comprising a plurality of data-bursts, comprising the steps of:
   i) receiving and demodulating a first one of the data-bursts;
   ii) associating hypothesis data, representing an un-received data-burst or un-received data-bursts, with the received data burst or data-bursts, wherein the received data-burst or data-bursts is/are not processed by any comparison operation before being associated with the hypothesis data;
   iii) attempting to decode data related to the received and demodulated data-burst or data-bursts with the associated hypothesis data; and
   iv) if the decode is successful to power down the receiver, not receiving remaining data-bursts, and if the decode is unsuccessful receiving a further one of the data-bursts and repeating steps ii) to iv), until all of the data-bursts have been received.

2. A method as claimed in claim 1, wherein the decoding is performed by a convolutional decoder that accepts metadata representative of an estimate of the validity of the data-burst and hypothesis data, and wherein the metadata associated with the hypothesis data is set to a low validity value.

3. A method as claimed in claim 1, in which the hypothesis data is generated from preceding data which had been decoded.

4. A method as claimed in claim 3, in which the hypothesis is stored in memory.

5. A method as claimed in claim 1, in which the data to be decoded is a paging block within a radio telecommunications system.

6. A method as claimed in claim 5, in which the paging block comprises first to fourth data-bursts, and the hypothesis data only corresponds to one data-bursts worth of data.

7. A method as claimed in claim 6, in which the hypothesis data corresponds to the fourth data-burst.

8. A method as claimed in claim 5, in which the hypothesis data corresponds to two data-bursts worth of data.

9. A method as claimed in claim 5, in which the hypothesis data corresponds to three data-bursts worth of data.

10. A method as claimed in claim 1, in which hypothesis data is always associated with the first data-burst irrespective of a degree of correlation between the received first one of the data-bursts and hypothesis data corresponding to that data-burst.

11. A telecommunications receiver adapted to decode data transmitted as a plurality of data-bursts, the receiver arranged to:

i) receive a first one of the data-bursts;
ii) associate hypothesis data, representing an un-received data-burst or un-received data-bursts, with the received data-burst or data-bursts, wherein the received data-burst or data-bursts is/are not processed by any comparison operation before being associated with the hypothesis data;
iii) attempt to decode data related to the received data-burst or data-bursts with the associated hypothesis data; and
iv) if the decode is successful to power down the receiver, not to receive remaining data-bursts, otherwise to receive a further data-burst and to repeat the attempt to decode the data.

12. A telecommunications receiver as claimed in claim 11, in which the hypothesis data is weighted to have a low validity.

13. A receiver as claim 11, further including a hypothesis generator for generating hypothesis based on previously decoded data.

14. A GSM terminal including a receiver as claimed in claim 11.

* * * * *